United States Patent [19]

Gofman

[11] Patent Number: 5,317,528
[45] Date of Patent: May 31, 1994

[54] RANDOM NUMBER GENERATOR

[75] Inventor: Emanuel Gofman, Haifa, Israel

[73] Assignee: International Business Machines Corporation, Armonk, N.Y.

[21] Appl. No.: 127,104

[22] Filed: Sep. 27, 1993

Related U.S. Application Data

[63] Continuation of Ser. No. 954,186, Sep. 30, 1992, abandoned.

[30] Foreign Application Priority Data

Oct. 7, 1991 [IL] Israel ..................................... 99660

[51] Int. Cl.$^5$ ............................................. G06F 1/02
[52] U.S. Cl. ................................................. 364/717
[58] Field of Search .................... 364/717, 717.5, 736, 364/754; 380/48

[56] References Cited

U.S. PATENT DOCUMENTS

| | | | |
|---|---|---|---|
| 4,667,301 | 5/1987 | Chiu et al. ........................... | 364/717 |
| 4,852,037 | 7/1989 | Aoki ..................................... | 364/736 |
| 4,969,118 | 11/1990 | Montoye et al. ................... | 364/748 |
| 5,128,890 | 7/1992 | Girardeau, Jr. ................... | 364/754 X |

OTHER PUBLICATIONS

D. G. Carta, 'Two Fast Implementations of the "Minimal Standard" Random Number Generator', Jan., 1990, pp. 87–88, vol. 33, No. 1., N.Y., U.S.
The Art of Computer Programming, Second Edition; Addison–Wesley Series in Computer Science and Information Processing, pp. 11–14, 1981.
IBM Technical Disclosure Bulletin, vol. 30, No. 3, Aug., 1987, Multiply-Addition–An Ultra High Performance Data Flow, pp. 982–987.
Design of the IBM Risc System/6000 Floating-Point Execution Unit, R. K. Montoye et al, IBM J. Res. Development, vol. 34, No. 1, Jan. 1990, pp. 59–70.
A Pseudo–Random Number Generator for the System/360 by P. A. W. Lewis et al, IBM Systems Journal, vol. 8, No. 2, 1969, pp. 136–146.

Primary Examiner—Tan V. Mai
Attorney, Agent, or Firm—Casimer K. Salys

[57] ABSTRACT

A pseudo random number generator is provided which generates the next number in a pseudo-random sequence of numbers from a binary representation of an input number and a primitive root of a prime number P, where P has the form $2m-1$, m being an integer. The binary representations of the current random number and the primitive root are multiplied to form a binary product. The binary number represented by bits 0 to $m-1$ of the product are added to the binary number represented by bits m to $2m-1$ of the product to form a sum. The contents of bit m of the sum are then added to the sum, via the carry-in input of the adder. The next binary number in the sequence is represented by bits 0 to $m-1$ of the sum with the contents of bit m thereof so added. Particular applications include data processors having an imbedded multiply-add unit with reconfiguration resources to implement the invention.

5 Claims, 2 Drawing Sheets

RANDOM NUMBER GENERATOR

This is a continuation of application Ser. No. 07/954,186 filed Sep. 30, 1992 now abandoned.

BACKGROUND OF THE INVENTION

A pseudo-random number generator is one of the most extensively used computer functions. It is included in the standard libraries of almost all programming languages. A random number generator might be called several million times during one run of a large simulation process.

One prior art method of random number generation is described in Lewis P A W, Goodman A S, and Miller J M "A Pseudo-Random Number Generator for the System/360", IBM System J., 8, pp 136-146, (1969) [1].

The generator described in [1] is based on the following recursion formula:

$$X_{i+1} = A\, X_i (\bmod P). \qquad (1)$$

where A is a positive primitive root of prime P, and the starting seed $X_0$ may be any number between 1 and P-1 inclusive. This method will generate all the values between 1 and P-1 in some order with no repetition.

The larger P is, the longer is the period of generated random numbers. Usually the largest prime number representable in one machine word is selected for random number generation. On a 32-bit machine it is $2^{31}-1$, and almost all generators on such machines use it.

This method is known as the linear congruential generation method. Implementation of a random number generator function according to this method requires only two instructions, one multiply instruction and one divide instruction.

However, while multiplication on modern computers may be done in one machine cycle, division is relatively slow, and usually requires several cycles.

SUMMARY OF THE INVENTION

The present invention discloses a random number generator which does not use a divide instruction.

In accordance with the present invention, therefore, there is provided a random number generator for generating the next number in a pseudo-random sequence of numbers from a binary representation of an input number and a primitive root of a prime number $P=2^m-1$, where m is an integer, the primitive root being represented as a binary number, the random number generator comprising:

means for multiplying the binary representations of the current random number and the primitive root to form a product;

means for adding the binary number represented by bits 0 to m−1 of the product, where bit 0 represents the least significant bit, to the binary number represented by bits m to 2m−1 of the product to form a sum and for adding the contents of bit m of the sum to the sum, the next binary random number being represented by bits 0 to m−1 of the sum with the contents of bit m thereof so added.

In a preferred form of the invention the means for adding is a carry-around adder having at least m output bits and a carry-in input, bit m of its output being connected to its carry-in input.

According to this invention special features of prime numbers representable in the form $2^m-1$ allow the division to be performed using one addition instruction.

The invention finds particular application in modern data processors having an imbedded multiply-add unit, for example the IBM RISC SYSTEM/6000 multiply-add fused unit described in Montoye R K, Hokenek E and Runyon S L, "Design of the IBM RISC SYSTEM/6000 Floating Point Execution Unit". IBM J. of R & D 34 pp 59–70 (1990) [2]. This multiply-add unit performs the accumulate operation (A*B)+C as an indivisible operation in one machine instruction.

DESCRIPTION OF THE PREFERRED EMBODIMENTS

Embodiments of the invention will now be described, by way of example, with reference to the accompanying drawings.

In the first embodiment of the invention the random number generator uses the prime $P=2^{31}-1$ and takes as input the primitive root A and the current number $X_i$ in the pseudo-random sequence defined by equation (1) and provides at its output the next number $X_{i+1}$ in the pseudo-random sequence.

Figure 1:
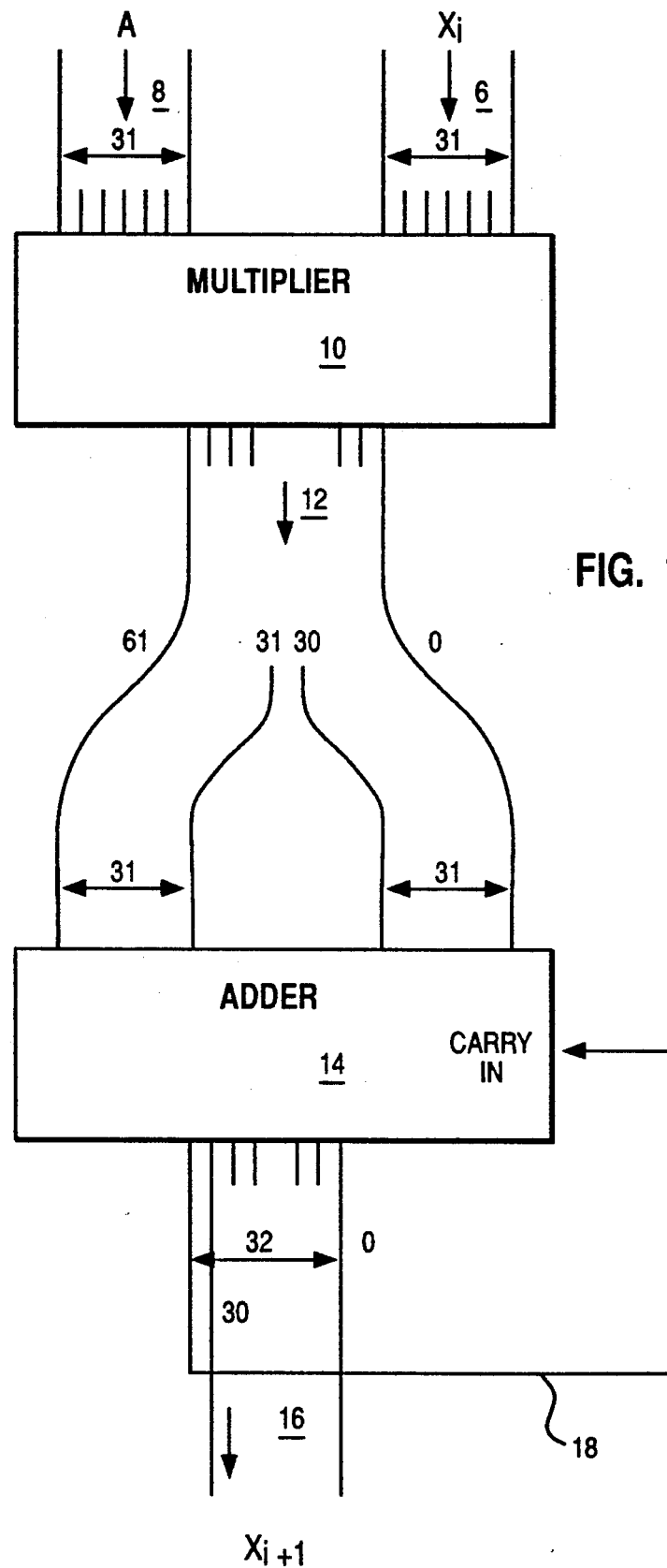
FIG. 1 shows a first embodiment of a random number generator in accordance with the present invention.

Referring to FIG. 1, 32-bit multiplier 10 receives at input 6 the current number $X_i$, represented as a binary number, and a binary representation of the primitive root A at input 8. Multiplier 10 outputs the product of its inputs at output 12. Bits 0 to 30 of output 12 are added by adder 14 to bits 31 to 62 of output 12 to form a sum.

Output line 18 carrying bit 31 of the sum is connected to the carry-in input of adder 14 to form a so-called carry-around adder. Thus the contents of bit 31 of the sum are added to the sum. The next number $X_{i+1}$ in the pseudo-random sequence is formed by bits 0 to 30 of the sum with the contents of bit 31 so added and appears at output 16 of the random number generator.

It is known that selecting the number 16807 as the primitive root A provides the generator with very good statistical features. Other possibilities for A are 742938285 and 950706376.

In the following it will be shown that the pseudo-random sequence generated by a random number generator in accordance with the present invention is equivalent to a pseudo random sequence generated using the method described in [1].

For the dividend D and the divisor P the remainder r and the quotient q are defined by, $D=qP+r$, where $r<P$. For the divisor $P+1$ we will denote the corresponding quotient and remainder as Q and R. Thus $D=Q(P+1)+R$, where $R\leq P$. Let $d=D/P - D/(P+1) = D/(P(P+1))$.

In the recursion formula defined by equation (1) we define $D\equiv AX_i$, where $A<P$ and $X_i<P$, and $X_{i+1}\equiv r$. Therefore $D<P^2$ and $d<1$. As q and Q are the integer parts of numbers whose difference is less than 1, and $Q\leq q$, it is also true that $0\leq q-Q\leq 1$. There are therefore only two possible cases, either $q=Q$ or $q=Q+1$. If $q=Q$, it can be shown that $r=Q+R$ and if $q=Q+1$, then $r=Q+R-P$.

It is known that r>0. Therefore, in the second case, Q+R>P and for $P=2^m-1$, $Q+R\geq 2^m$. Also, $Q+R<2^{m+1}$, since both Q and R are less than P. It follows therefore that if q=Q+1, then, in a binary representation of Q+R, the (m+1)th bit is always 1. If q=Q, then it is 0. This bit can therefore be used to distinguish the two cases.

Implementation of this method can be achieved in the following way. In the following bits in a word shall be numbered from right to left so that bit 0 is the least significant bit.

For $P=2^m-1$, the m least significant bits, i.e. bit 0 to m−1, of D are equal to R. The most significant bits, from m to 2m−1, contain Q. r can therefore be obtained as Q+R+(contents of bit m). This is calculated by setting the adder carry-in according to the contents of bit m and by ignoring all most significant bits in the sum, starting from bit m.

Figure 2:
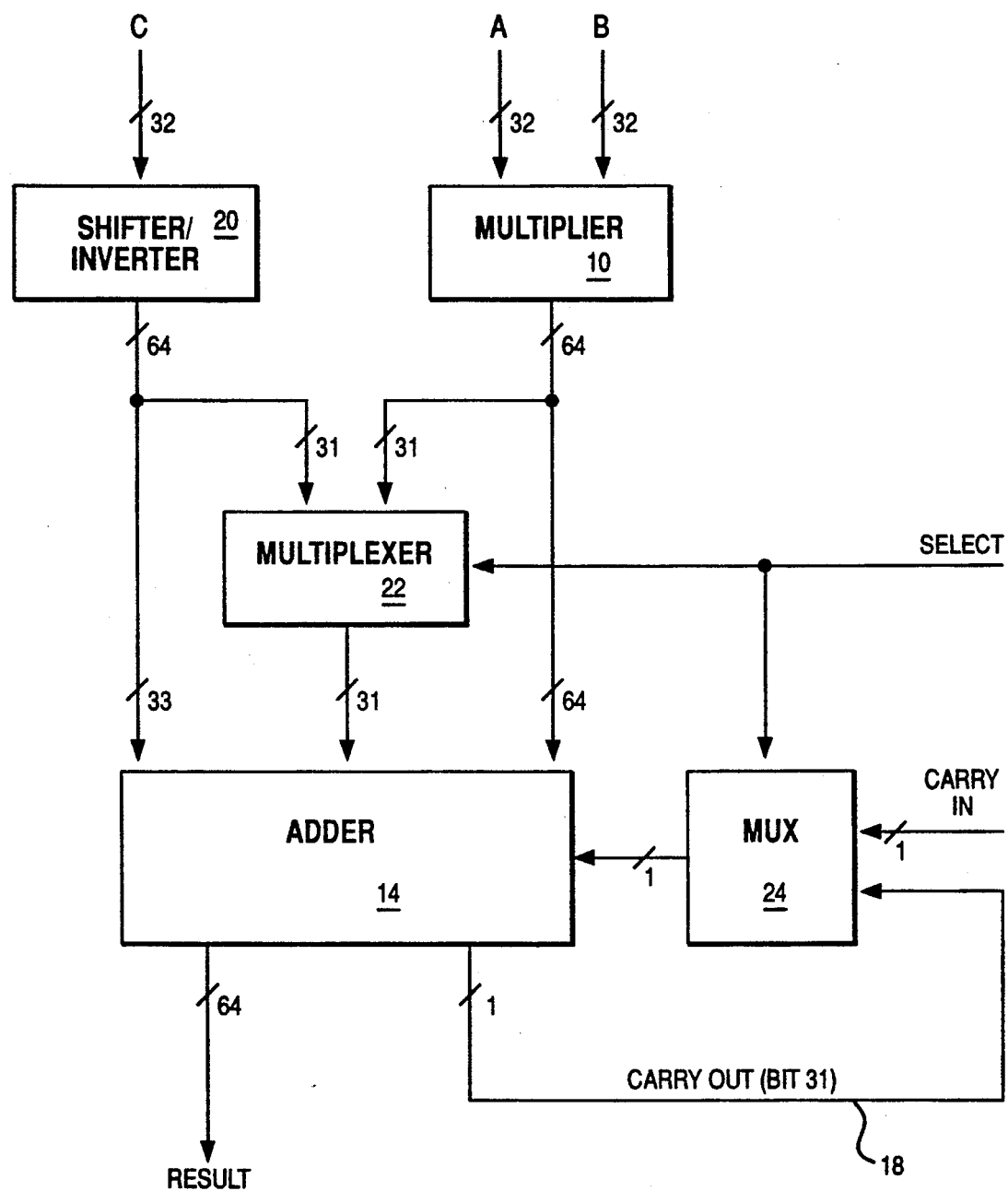
FIG. 2 shows a second embodiment of a random number generator in accordance with the present invention.

A second embodiment of the invention is shown in FIG. 2, and generates the random number using one native machine instruction in a processor of a type having an embedded multiply-add unit. It uses prime $P=2^{31}-1$. Any of the positive primitive roots of that prime may be used as an operand of the suggested machine instruction.

The multiply add unit has three inputs A, B and C and performs (A*B)+C as its basic operation. Inputs A and B feed the multiplier 10, the output of which together with the output from shifter/inverter 20 are inputs to the adder 14. The shifter is used to adjust the C-summand when required. For example, the inverter and the carry-in to the adder allow the multiply-add unit to perform a multiply-subtract instruction as well.

The random number generator is implemented as two operand instruction RNG A,X, where A (A input) is the primitive root of P and X (B input) is the current number in the pseudo-random sequence. Input C does not affect the execution of the instruction.

The multiply-add unit is modified with the addition of a 31-bit wide multiplexor or selector 22 on the left input to the adder. When executing the RNG instruction, it selects the bits 61-31 of the product and uses them as bits 30-0 of the left summand. The right summand is submitted to the adder in the same way as in a multiply-add instruction. There is no need to force bits 63-32 of the summands to zero, since these bits do not affect the final result of the RNG instruction. Only bit 31 of both inputs to the adder should be forced to zero. Carry-out of the bit 31 of the sum is fed back to the adder carry-in input via multiplexor 24 to perform the required correction. After addition the 31 least significant bits (bits 30-0) of the sum contain the next number in the pseudo-random sequence.

I claim:

1. An apparatus for generating in binary form a pseudo-random number from an input number and a primitive root of a prime number, comprising:

a multiply-add unit for performing the operation A * B+C, comprising;
   an electronic multiplier receiving binary signals representing A and B;
   an electronic shifter receiving a binary signal representing C; and
   an electronic carry-around adder receiving output signals from the multiplier and the shifter;
a multiplexing means for selectively transmitting signals from the multiplier or the shifter to the carry-around adder;
means for selecting, as a carry input signal to the carry-around adder, between a multiply-add unit carry in signal and a selected output signal from the carry-around adder; and
means for selectively enabling the multiplexer means and the means for selecting, to generate pseudo-random number signal outputs from the carry-around adder.

2. Random number generator for generating the next number in a pseudo-random sequence of numbers from a binary representation of an input number and a primitive root of a prime number P, where $P=2^m-1$, where m is an integer, the primitive root being represented as a binary number, the random number generator comprising:

binary multiplier for receiving signals on a first set of input lines, representing the current random number, and for receiving signals on a second set of input lines, representing the primitive root, and for generating responsive to the signals on the input lines product signals on a first set of output lines;

binary adder for receiving signals on lines carrying binary bits 0 to m−1 of the first set of output lines, where bit 0 represents the least significant bit, and for adding the binary number represented by the signals on lines carrying bits m to 2m−1 of the first set of output lines to form sum signals on a second set of output lines, and for further adding the binary value of the signal on the line in the second set of output lines representing bit m, the next binary random number being represented by bits 0 to m−1 of the combined sum signals on the second set of output lines.

3. Random number generator as claimed in claim 2 wherein said binary adder is a carry-around adder having at least m output bits and a carry-in input, bit m of the output bits being connected to the carry-in input.

4. Random number generator as claimed in claim 2 in the form of a multiply-add unit for performing the operation (A * B)+C in one machine instruction and having a multiplier portion and an adder portion, the generator including means for directing bits m to 2m−1 of the output of the multiplier portion to the C input of the adder and means for directing the output bit m of the adder portion to the carry-in input of the adder portion.

5. Method for generating the next number in a pseudo-random sequence of numbers from a binary representation of an input number and a primitive root of a prime number P, where $P=2^m-1$, where m is an integer, the primitive root being represented as a binary number, the method comprising:

providing as an input to a binary multiplier signals on a first set of input lines, representing the current random number, and signals on a second set of input lines representing the primitive root, to generate product signals on a first set of output lines of the binary multiplier;

providing as an input to a binary adder the signals on lines carrying binary bits 0 to m−1 of the first set of output lines, where bit 0 represents the least significant bit, which adds the binary number represented by the signals on lines carrying bits m to 2m−1 of the first set of output lines to form sum signals on a second set of output lines; and further providing as an input to the binary adder the signal on the line in the second set of output lines representing bit m, the next binary random number being represented by bits 0 to m−1 of the combined sum signals on the second set of output lines.

* * * * *